UNITED STATES PATENT OFFICE.

WILLIAM B. GROVER, OF CHESTER, PENNSYLVANIA.

PAINT.

SPECIFICATION forming part of Letters Patent No. 423,047, dated March 11, 1890.

Application filed May 24, 1889. Serial No. 311,995. (No specimens.)

*To all whom it may concern:*

Be it known that I, WILLIAM B. GROVER, a citizen of the United States, residing at Chester, in the county of Delaware and State of Pennsylvania, have invented a certain new and useful Composition for Paint, of which the following is a full, clear, and exact description or specification.

My invention relates to composition for the manufacture of paint, and has for its principal object a production of a paint which shall be water-proof; and to that end it consists, primarily, in compounding a paint-body from refined bituminous-gas coal-tar as a base for the composition, the other ingredients being added in the manner, form, and proportion as hereinafter set forth.

The design of my invention is to produce a paint composition which shall be weather and acid proof, shall be adhesive to the surface to which it is applied, and possess the quality of elasticity in the sense of conforming, without injury, to the expansion or contraction of the surface to which it is applied, caused by changes of temperature, and finally in its resistance to corrosive effects, and the absence of evaporation of constituent parts, as is common with metallic and other paints.

The base of the composition, as stated, is refined coal-tar from the refuse of bituminous gas coal, and if this is not to be had commercially in its purely-refined state (in which condition I have not been able to find it) I refine it as follows, viz: By a process of open distillation in which the coal-tar is brought to a heat of about 212° to 220° Fahrenheit, and is distilled until there is no sediment perceptible rising to the top surface, which process will take from one and one-half to two and one-quarter hours, depending upon the quality of the tar, the resultant product being perfectly clear in appearance, and, if well refined, the process will extract from the coal-tar all the ammonia, creosote, and all other acids, together with the lighter oils—such as benzine, benzole, &c.—usually contained in such gas-tar, while all the dead-oils will be given off or evaporized during the process. I also make use of the dead-oils from coal-tar in addition to the refined coal-tar from bituminous coal produced as above mentioned, and these dead-oils are obtained from the refuse coal-tar by fractional distillation in a close vessel; but, as they can be obtained commercially, I do not distill such dead-oil for use in the composition, because able so far to obtain it in the market.

In the manufacture of the base I use an ingredient known commercially as "pulp," or "rubber pulp," which I understand to be common india-rubber or caoutchouc that has been saturated with benzine and dissolved by coal-oil; but the commercial pulp at present to be had answers the purpose of my composition, and this material I dissolve by using the aforesaid dead-oil obtained from coal-tar by fractional distillation.

The proportions and the manner of mixing are as follows, viz: To one gallon of the tar aforesaid unbroken residuum of bituminous coal obtained by said open distillation thereof is added the rubber solution, which consists of five ounces of the rubber pulp to one quart of the dead-oil. Litharge to the amount of four ounces is added, in a pulverized form, as a drier, and one-half pint of copal or other varnish is added to give the mixture a gloss. The rubber pulp is dissolved in the mixture by bringing it into a heated condition, and the other ingredients, after being ground in the mill, are mixed therewith in the ordinary manner of mixing paints. The coloring-matters used are mineral colors only, and the proportion varies according to the color, as is usual with paint composition.

It is apparent that some other drier may be substituted for the litharge, with more or less like results.

The proportions stated of the several ingredients may be slightly varied without substantially varying the resultant composition produced.

Having thus described my invention, what I claim as new, and desire to secure by Letters Patent, is—

1. A paint body or composition having for a base a solution of rubber pulp in dead-oil of coal-tar, with the distilled unbroken residuum of bituminous-gas coal-tar afterward added thereto, the said ingredients being compounded in the manner and in or about the proportions set forth.

2. A paint body or composition consisting of rubber pulp dissolved in dead-oil of coal-tar, a drier, such as litharge, a varnish, such as copal, a mineral coloring-matter, and the distilled unbroken residuum of bituminous-gas coal-tar, said parts being mixed in the manner and in or about the proportions set forth.

In testimony whereof I have hereunto affixed my signature this 23d day of May, A. D. 1889.

WILLIAM B. GROVER.

Witnesses:
ANDREW ZANE,
H. T. FENTON.